United States Patent
Ijtsma et al.

(10) Patent No.: US 7,164,636 B2
(45) Date of Patent: Jan. 16, 2007

(54) RECORDING APPARATUS AND METHOD OF RECORDING DATA

(75) Inventors: Pope Ijtsma, Eindhoven (NL); Dirk Hamelinck, Hasselt (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 207 days.

(21) Appl. No.: 10/495,954

(22) PCT Filed: Nov. 14, 2002

(86) PCT No.: PCT/IB02/04801

§ 371 (c)(1),
(2), (4) Date: May 18, 2004

(87) PCT Pub. No.: WO03/044794

PCT Pub. Date: May 30, 2003

(65) Prior Publication Data

US 2005/0018571 A1    Jan. 27, 2005

(30) Foreign Application Priority Data

Nov. 22, 2001 (EP) ................................. 01204485
Aug. 21, 2002 (EP) ................................. 02078457

(51) Int. Cl.
*G11B 7/00* (2006.01)

(52) U.S. Cl. ................................. 369/47.53; 369/53.15
(58) Field of Classification Search ............. 369/44.26, 369/44.32, 53.15, 47.14, 47.27, 53.35, 47.28, 369/47.5, 47.51, 47.52, 47.53, 116, 275.3, 369/53.14, 53.16
See application file for complete search history.

(56) References Cited

U.S. PATENT DOCUMENTS

| 5,303,219 | A * | 4/1994 | Kulakowski et al. .... 369/53.17 |
| 5,379,276 | A * | 1/1995 | Igami et al. ................ 711/118 |
| 6,678,220 | B1 * | 1/2004 | Saga ........................ 369/44.27 |
| 6,876,611 | B1 * | 4/2005 | Adachi .................... 369/47.53 |

* cited by examiner

*Primary Examiner*—Nabil Z. Hindi
(74) *Attorney, Agent, or Firm*—Michael E. Belk

(57) ABSTRACT

A recording apparatus for recording data on a rewritable optical recording medium includes a read/write head for reading and recording data, an error corrector for finding and correcting errors in the recorded data read, and a controller for controlling the recording and reading of the data. The recording apparatus is capable of performing fast and efficient examination of formatted recording medium in order to adapt a data recording strategy, so as to increase the efficiency of writing operations.

33 Claims, 5 Drawing Sheets

RECORDING APPARATUS AND METHOD OF RECORDING DATA

The invention relates to a recording apparatus for recording data on a rewritable optical recording medium provided with substantially circular recording tracks comprising recorded data arranged in recording units comprising addressable reading units, the recording apparatus comprising:
input means for receiving the data;
recording means for recording the data;
reading means for reading the recorded data;
error correction means for finding and correcting errors in the recorded data read; and
control means for controlling recording and reading of the data.

The invention further relates to a method of examining a rewritable optical recording medium for the presence of a defect in order to adapt a data recording strategy, the medium being provided with substantially circular recording tracks comprising recorded data arranged in recording units comprising addressable reading units.

An embodiment of the above apparatus is known from international patent application WO 01/22416. It discloses the recording apparatus capable of performing initialization, formatting and defect management of a rewritable medium such as a CD-RW disc. This is done to facilitate the use of CD-RW as a high-capacity floppy disc, so immediate writing or reading of files is possible.

The defect management as described in WO 01/22416 provides information about bad recording units, recording units also referred to as packets, found during formatting or read/write operations. This information is stored on the disc. However, during storage of the disc outside the drive the number of defects, such as scratches or fingerprints, may increase. Moreover, information about these new defects is missing on the disc. As a consequence, during a recording operation, all write steps have to be followed by a verification step, thus considerably slowing down the performance of the drive.

It is a first object of the invention to provide a recording apparatus of the type described in the opening paragraph, which is capable of performing efficient recording operations.

The first object is achieved, according to the invention, in that
the control means are designed to examine the medium for the presence of a defect and to adapt a data recording strategy by:
scanning the medium by reading at least a portion of the recorded data;
establishing characteristics of the recorded data read;
rating the recorded data read as defective data based on the characteristics; and adapting the data recording strategy according to results of the rating.

The apparatus according to the invention is advantageous in that the actual recorded data present on the medium are used to examine the medium and the data recording strategy is adapted according to the results of this examination.

In an embodiment for the recording apparatus the control means are designed to perform a scanning of a predefined number of the reading units in each recording unit on the medium, and to indicate a recording unit in a defective recording units table, if any of the reading units comprised in the recording unit is rated as being defective. This embodiment is advantageous in that it facilitates detection of defects, which belong to a special class of defects referred to as Direct-Over-Write (DOW) defects. These defects are caused by a limited number of possible overwrites of the medium. The reading units are also referred to as frames.

In another embodiment of the recording apparatus the control means are designed to rate the recorded data read as defective data if at least one of the following conditions is fulfilled:
errors were found and corrected;
errors were found and not corrected;
errors are present in the address of a reading unit;
the error correction means could not be used due to inconsistency of the recorded data read. This embodiment is advantageous in that it provides simple and clear criteria for rating the recorded data, which can be used for efficient examination of the medium.

In a further embodiment of the recording apparatus the control means are designed to select areas of the medium, also referred to as zones, and to examine selected areas. This is advantageous in that it speeds up the examination and the data recording strategy can be adapted locally.

It is advantageous, if the control means are designed to perform a scanning of a predefined number of the reading units comprised in a selected area and to indicate the selected area in a defective areas table, if any of the reading units is rated as being defective. In this way the examination is speeded up further and a table of "coarse" defects is created, which can be used in making quick decisions concerning the data recording strategy.

A further embodiment for the recording apparatus is characterized in that the data recording strategy comprises:
a write step comprising the recording of the data in a recording unit; and
a verification step following the write step, comprising the reading of data recorded in the recording unit in the write step and comparing the data recorded with the data;
the control means are designed to adapt the data recording strategy to achieve that the verification step is performed only if at least one of the following conditions is fulfilled:
examining has not yet been completed;
the recording unit is indicated in the defective recording units table.

This embodiment is advantageous in that writing in units without defects will be much faster, thus improving overall performance of the recording apparatus.

It is beneficial for the control means to be designed to perform a scanning of all the reading units in each recording unit comprised in the area indicated in the defective areas table, and to indicate a recording unit in a defective recording units table, if any of the reading units comprised in the recording unit is rated as being defective. This allows a more accurate inspection of defective areas found during "quick" examination.

In another embodiment of the recording apparatus, the control means are designed to select a circular area between two substantially concentric substantially circular recording tracks on the medium. This makes a fast reading of the recorded data possible.

It is beneficial, if the control means are designed to examine the circular area by examining a test recording track in the middle of the circular area. This is advantageous in that it makes a search for defects more effective.

In a following embodiment of the recording apparatus according to the invention, the control means are designed to examine test recording tracks substantially 200 µm apart.

This embodiment is advantageous in view of a size of expected defects, which cannot be corrected by standard error correction means.

In an advantageous embodiment the control means are designed to determine recording parameters of the medium, to calculate a number of the recording tracks using the recording parameters and to position the reading means by jumping over the number of the recording tracks. This embodiment further enhances performance of recording operations by providing a fast, yet accurate, way of positioning of the reading means during the examination phase.

A following embodiment of the recording apparatus according to the invention, is characterized in that the control means are designed to examine the medium during an idle time of the recording apparatus. This is advantageous in that the recording apparatus is almost always ready to accept read/write commands, thus increasing its performance.

It is a second object of the invention to provide a method of the type described in the opening paragraph which can be applied to perform efficient recording operations.

The second object is, according to the invention, realized by a method comprising the following steps of:

scanning the medium by reading at least a portion of the recorded data;

establishing characteristics of the recorded data read;

rating the recorded data read as defective data based on the characteristics;

adapting a data recording strategy according to results of the rating.

These and other aspects of the apparatus and the method of the invention will be further elucidated and described with reference to the drawings, in which.

Figure 1:
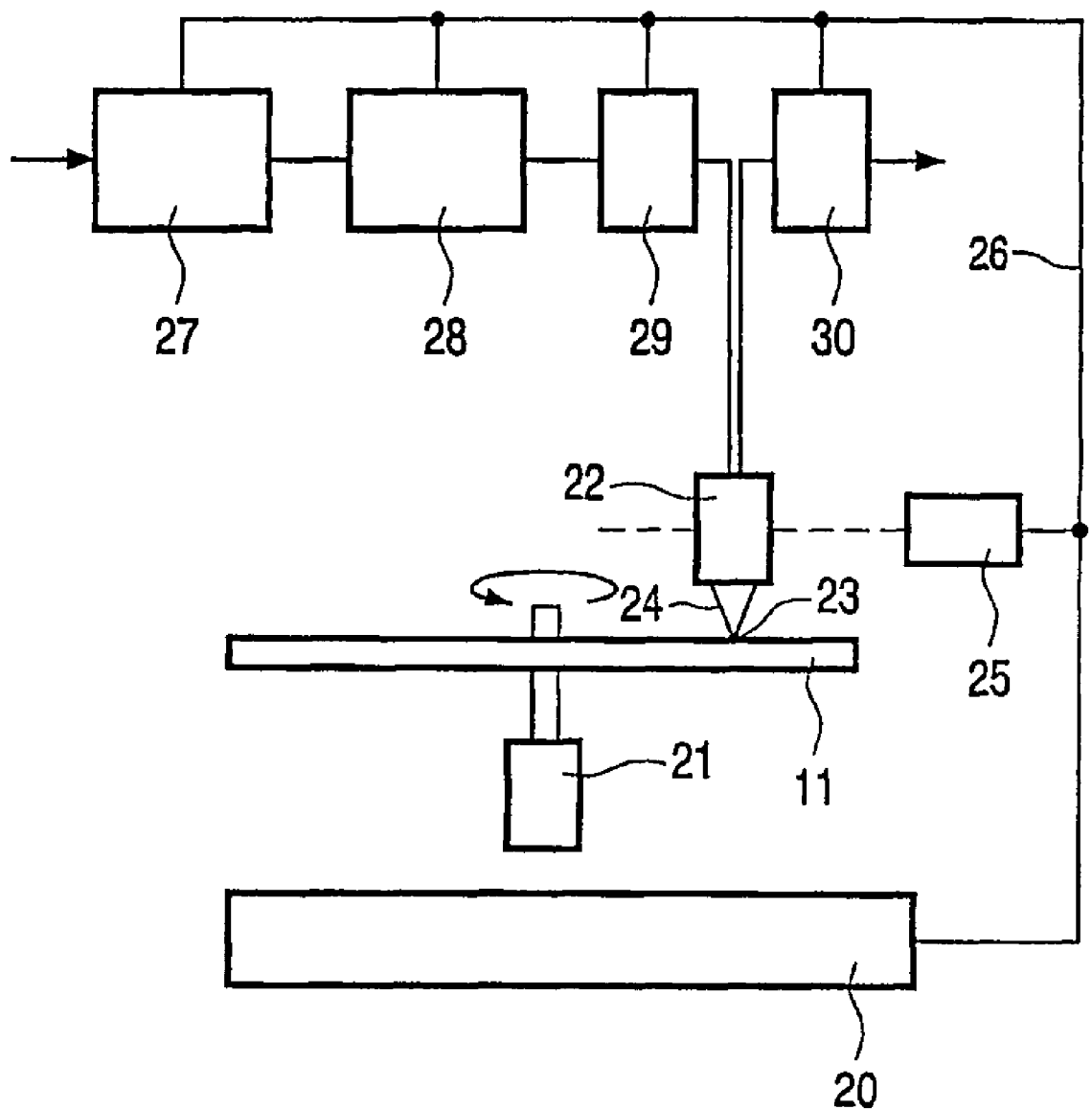
FIG. 1 shows an embodiment of the recording apparatus.

FIG. 1 shows an embodiment of the recording apparatus for recording data on a rewritable optical recording medium 11 in accordance with the invention. The apparatus in FIG. 1 is provided with recording means (21, 22, 25, 28) for recording data in the track on the optical recording medium, which means include a drive unit 21 for rotating the optical recording medium 11, a head 22, a positioning unit 25 for coarsely positioning the head 22 in the radial direction on the track and write-processing means 28. The head 22 comprises an optical system of a known type for generating a radiation beam 24 guided through optical elements focused to a radiation spot 23 on a track of the information layer of the optical recording medium. The radiation beam 24 is generated by a radiation source, e.g. a laser diode. The head further comprises (not shown) a focusing actuator for moving the focus of the radiation beam 24 along the optical axis of said beam and a tracking actuator for fine-positioning of the spot 23 in a radial direction on the center of the track. The tracking actuator may comprise coils for radially moving an optical element or may, alternatively, be arranged for changing the angle of a reflecting element.

For writing information the radiation is controlled to create optically detectable marks in the recording layer. The write-processing means 28 process information which is received by input means 27, to generate a write signal to drive the head 22. The write-processing means 28 may comprise a formatter and a modulator. It is noted that for computer applications a host computer may directly be interfaced to the write-processing means 28. Hence a data interface may either be inside the device (e.g. a consumer video recorder) or outside the device (e.g. a PC peripheral).

For reading, the radiation reflected by the information layer is detected by a detector of a usual type, e.g. a four-quadrant diode, in the head 22 so that a read signal is generated as are further detector signals including a tracking error and a focusing error signal for controlling said tracking and focusing actuators. The read signal is processed by read-processing unit 30 of a usual type including a demodulator, deformatter and output unit to retrieve the information. Hence reading means (21, 22, 25, 30) for reading information include the drive unit 21, the head 22, the positioning unit 25 and the read processing unit 30. The control unit 20 controls the recording and reading of information and may be arranged for receiving commands from a user or from a host computer. The control unit 20 is connected via control lines 26, e.g. a system bus, to said input means 27, to write-processing means 28, to read-processing unit 30, and to drive unit 21, and positioning unit 25. The control unit 20 comprises control circuitry, for example a microprocessor, a program memory and control gates, for performing the procedures and functions according to the invention as described below. The control unit 20 may also be implemented as a state machine in logic circuits. The input means 27 processes the input data, which are passed to the write-processing means 28 for adding control data and formatting the data according to a file management system. Furthermore, the formatted data are modulated by e.g. a channel coder generating a modulated signal which drives the head 22. In addition, the write-processing means may include synchronizing means for including synchronizing patterns in the modulated signal. The formatted data units comprise address information and are written to corresponding addressable locations on the optical recording medium under the control of control unit 20. The control unit 20 is arranged for recording and retrieving position data indicative of the position of the recorded information volumes. During the writing operation, marks representing the information are formed on the optical recording medium. The marks may be in any optically readable form, e.g. in the form of areas with a reflection coefficient different from their surroundings, obtained when recording in materials such as dye, alloy or phase-change material, or in the form of areas with a direction of magnetization different from their surroundings, obtained when recording in magneto-optical material. Writing and reading of information for recording on optical discs and usable formatting, error correcting and channel coding rules are well known in the art, e.g. from the CD system. The marks can be formed by means of the spot 23 generated on the recording layer via the beam 24 of electromagnetic radiation, usually from a laser diode.

The examination of the optical recording medium 11 is performed by the control unit 20. It has to find the defects on the optical recording medium. The control unit 20 performs the scanning for defects by reading data recorded on the optical recording medium and collecting information about errors found in read frames. This information is used by the control unit 20 during writing operations to adapt a data recording strategy. The read-processing unit 30 comprises error correction means for finding and correcting errors in the data read. These means employ the error correction procedures such as Cyclic Redundancy Check. The control unit 20 is rating the read frames as being defective based on collected information about errors found within these frames. The unreliable frames should be excluded from checking. For example, the part of the link sequence is not checked; it is recognized and skipped. This ensures that the examination will not add fake defects which could appear due to the checking of the link sequence.

An embodiment of the recording apparatus is realized by adapting the control unit 20 to use the following criteria for the recognition of defective frames:

the error correction procedure ran and succeeded,
the error correction procedure ran and did not succeed,
the header containing an address of the frame is corrupted,
the address of the frame contains "impossible" data, which are correctly written but the values of which are incorrect,
the error correction procedure could not be used due to inconsistency of data.

A particular frame is rated as being defective if at least one of the above conditions is fulfilled. It should be noted that one can use additional, different criteria to rate the read frames as defective.

Another embodiment of the recording apparatus is realized by adapting the control unit 20 to select areas of the medium and to perform the examination of selected areas.

The control unit 20 can be further adapted to perform scanning of a predefined number of frames comprised in a selected area. If any of the frames read in the selected area is rated as being defective, the whole area is considered defective; the control unit 20 collects information about such areas.

Results of the examination are important for the data recording strategy. It comprises:

a write step comprising the recording of data in a recording unit; and
a verification step following the write step, which comprises the reading of data recorded in the write step and comparing the data recorded with the data.

In another embodiment of the recording apparatus, the control unit 20 is adapted so that the write commands are executed without verification when the area in which the data is going to be written was scanned and did not contain defects.

Figure 2:
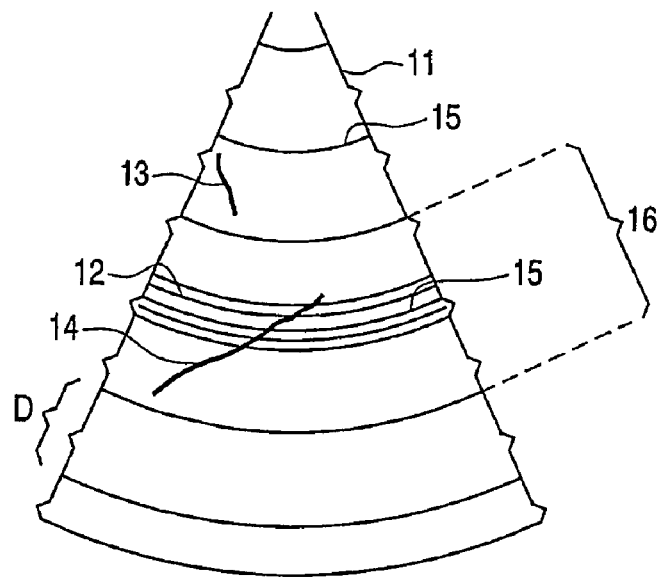
FIG. 2 shows a diagrammatic plan view of a part of a rewritable optical recording medium.

Advantageously, the control unit 20 can be adapted to perform the examination, which is divided into two stages: quick scan and fine scan. The quick scan starts e.g. from the beginning of spare area and advances along the radius of the disc over a predefined distance to the end of the disc. One test recording track is examined at each scanning position. This is done by reading all frames along the track. In this way, a circular zone is examined defined as an area between two test recording tracks neighboring the particular test recording track in the middle of the zone, as shown in FIG. 2. The quick scan is designed to find large defects such as scratches, dirt spots, fingerprints etc. In view of a size of expected defects, which cannot be corrected by standard error correction means, the optimal separation between two consecutive test recording tracks is 200 μm.

The control unit 20 can be modified, so the zones found as defective during quick scan execution can be verified by reading all the frames within packets that belong to the defective zone. If any of the frames read in a particular packet is rated as being defective, the whole packet is considered defective. The information about packets found to be defective is collected by the control unit 20.

The fine scan works differently from the quick scan. Its goal is to check each packet by reading at least one frame per packet. The intention is to find the DOW problems. The recording apparatus can write only with packet resolution, so the number of writes is the same for every frame in the packet. If the DOW problem exists, it ought to be visible in all the frames in the packet. This is foundation of the fine scan. The fine scan starts e.g. in the first packet of the spare area and advances over one packet to the end of the medium. Each time the fine scan reads at least one frame per packet to determine if the current packet contains defects. If so, the information about the current packet is collected by the control unit 20.

In another embodiment of the recording apparatus, the control unit 20 is adapted so that the write commands are executed without verification when the packet in which the data is going to be written is not indicated by the control unit 20 as containing defects and the examination is completed.

It should be noted that the control unit 20 can execute the quick scan and the fast scan as separate processes or as two stages of one examination, the examination having advantage of providing rather detailed yet fast information about defects on the medium.

The user expects the medium to be usable just after inserting it in the recording apparatus. Therefore, advantageously, in another embodiment the control unit 20 is adapted so that the compact commands are handled transparently during the examination of the medium, while all access commands will suspend it to allow medium access as soon as possible. The data will be written and verified afterwards. Suspended examination should be resumed after access command execution.

Yet another embodiment of the recording apparatus can be realized by adapting the control unit 20 so that the recording apparatus stays idle some time before the examination becomes active again. Idle time is preferably set to 4 seconds, so either the first start of the examination after the insertion of the medium or resumption after suspension can only take place when the idle time has already passed. This is done to avoid extensive switching between the examination and the execution of commands.

The examination functionality has to be considerably faster than the read functionality, otherwise checking for the defects should be implemented as background read during drive inactivity. These can be achieved by:

speeding up the drive to maximum (e.g. ×32) reading speed and reading all medium data as fast as possible, or by
employing a very quick, special algorithm which will not use the normal (and slow) drive seek procedures but be precise enough to allow visiting all the packets on the medium.

The first possibility cannot be used for the examination because, advantageously, it should be performed during the idle time of the recording apparatus. The user, however, may interrupt it by a read or write command. In this case, e.g. a host computer would have to wait until the disc spins down to the applied reading speed. The reading speed has been chosen to be the same as the writing speed so it is disc dependent. The reason for taking the same speed for the write and read operations is to avoid intensive speed switching between read and write commands. Each time the host would wait for the apparatus before the command could be executed.

The positioning of the head 22 during the examination is controlled by the control unit 20. For this purpose the control unit 20 can use a table containing addresses of positions on the optical recording medium 11 to be "visited" by the head 22. These addresses can be calculated using the static model of the disc and the track geometry. The model bounds the position on the disc (depending on the current radius) with an absolute time. This time can be converted to e.g. MSF address as known for the CD-ROM standard. The positioning of the head 22 is done by seeking the MSF address from the table.

Advantageously, the control unit 20 can be adapted to use a more precise model to calculate positions on the optical recording medium. Due to large mechanical tolerances allowed for discs, every disc can be slightly different in the radius where the track begins, distance between tracks, track pitch width and so on. Considering all possible situations there is only one way to service all discs in the same, consistent way: to use real disc parameters obtained during a calibration procedure after the insertion of the disc. Their details are kept in the Bit Engine data structures so the consequence is to use the Bit Engine functions for calculations.

Advantageously, one way to speed up the examination is to adapt the control unit 20 so that it uses jumps over the grooves instead of seeking MSF addresses for positioning of the head 22. Now then, the actual approach is: starting from the known position on the optical recording medium (e.g. beginning of the spare area) it should advance through all spare and data areas over a required distance. This distance (e.g. one zone for quick scan, one packet for the fine scan) is expressed by the number of grooves using real optical recording medium parameters and calculation routines.

The number of grooves to jump over is estimated as follows:
- the head 22 should be positioned at the known place (address);
- the address of the next scanning position is known from the table;
- the number of grooves is calculated by the control unit 20 using both addresses and the real optical recording medium parameters;
- the head 22 jumps over the number of grooves; the control unit 20 checks if current address corresponds to required address;
- if so, a check for defects is made, otherwise another try is made.

Reading at the actual scanning position (after the jump), one obtains the actual address which can be supplied to the advancing algorithm for the next calculation of a position. The same algorithm can be used for quick and fine scan. The first (initial) setting on the known position (address) is done by means of using seek MSF address.

This algorithm works well for the quick scan at the reading speed ×8, but for the fine scan the speed ×4 was found to be much better. This is caused by the offset which Bit Engine functions use to ensure that the current sought position will not be over jumped. The advancing algorithm (finding next packet jumping over the grooves) works well, however, at higher speeds the number of retries is necessary to find the next scanning position. This takes up more time than scanning at speed ×4.

A further embodiment of the recording apparatus is realized by adapting the control unit 20 to perform the examination only of the medium for which the formatting has finished; so it is in a e.g. CD-ROM compatible state. In case of the medium which was not formatted to full capacity, there is a possibility for the format to be resumed. Suppose that the medium has been inserted into the drive and the host issued a format command, in that case the examination will not be executed. When the medium is fully formatted there is no need for the examination since all defects should be found during format verification. On the other hand, when the formatted medium is inserted into the recording apparatus, and the apparatus is busy reading or/and writing, the examination will not start until the recording apparatus becomes idle.

FIG. 2 is a diagrammatic plan view of a part of a rewritable optical recording medium 11. Examples of such medium are CD-RW or DVD+RW, or a high-density rewritable disc using blue lasers, called Blu-ray Disc (BD). The optical recording medium 11 has a multitude of substantially circular recording tracks 12. To illustrate the present invention the recording medium 11 in FIG. 2 is shown with two disc defects 13 and 14 in the form of scratches.

The size of the first scratch 13 is comparatively small. Consequently, the affected track length of a recording track 12 damaged by the first scratch 13 is comparatively small, the number of tracks affected by the first scratch 13 being also comparatively small.

The CD-RW, DVD+RW and in particular BD systems are using powerful error correction mechanisms, so that they are substantially immune to errors produced over a comparatively small track length. Only when the affected track length becomes comparatively large will the error correction mechanism not be able to correct the resulting recording errors. By way of illustration, this is the case with the comparatively large scratch defect 14 and it is also apparent from FIG. 2 that the number of recording tracks 12 affected by the comparatively large scratch defect 14 is larger than the number of recording tracks affected by the comparatively small scratch defect 13. According to the invention, testing of recording tracks 12 is done by reading data recorded during previous recording sessions including formatting. In a particular embodiment it is proposed to examine only a limited number of recording tracks of the optical recording medium 11, the tracks to be examined being referred to as "test recording tracks". FIG. 2 shows some of these test tracks as comparatively bold lines referenced 15. The scratch 14 can be detected by the quick scan and the defective zone 16 can be examined in detail by scanning all frames belonging to it. Successive test recording tracks 15 are spaced apart by a predetermined distance D. Hereinafter it is assumed by way of example that D is 200 μm. However, it will be evident to one skilled in the art that D may have any other suitably selected value.

Figure 3:
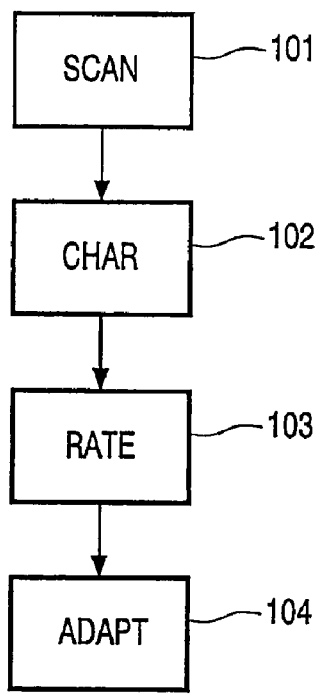
FIG. 3 shows an embodiment of the method of examining the medium for the presence of a defect in order to adapt a data recording strategy.

FIG. 3 shows an embodiment of the method of examining a rewritable optical recording medium comprising recorded data, in accordance with the invention. The method comprises four main steps. In step 101 the medium is scanned by reading at least a portion of the recorded data. The recorded data read is then characterized in step 102. This can be done by analyzing different properties of the recorded data read, but preferably the structure of the data and results of the applied error detection and correction procedures. In the next step 103 the recorded data read is rated based on its characteristics as determined in step 102. This rating is used to find out whether the data contains defects; different criteria can be applied to rate the data as defective, such as wrong structure of the data or faults reported by the error detection and correction procedures. Results of rating are employed in adapting the data recording strategy, which is done in step 104.

Figure 4:
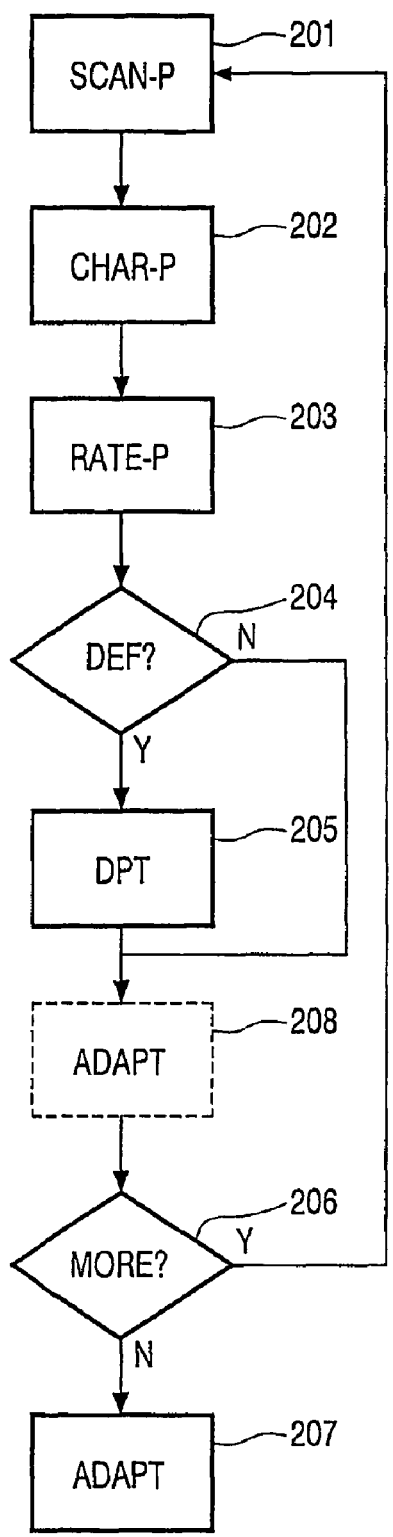
FIG. 4 shows an embodiment of the method, wherein all packets on the medium are scanned.

FIG. 4 shows another embodiment of the method of examining the recording medium. In this embodiment all packets on the medium are examined. This is done to look for DOW defects. In step 201 a predefined number of frames in a packet are scanned. The frames are characterized in step 202 and rated in step 203. In step 204, a check is made whether any of the frames is rated as containing defective data. If so, the packet comprising those frames is indicated in a defective packets table in the next step 205. In step 206 it is checked whether there are more packets to be examined. If there are more such packets, the next packet is taken to be analyzed in step 201. The data recording strategy is adapted in step 207. It should be noted that this step can also be performed before the examination of all packets has been completed as indicated by 208.

In an embodiment of the method of examining the recording medium, only one frame in a packet is scanned in step 201.

A further embodiment of the method of examining the recording medium is realized by using means for finding and correcting errors in the recorded data read and rating the data as defective data (in steps 103, 203, 303 or 403) if at least one of the following conditions is fulfilled:
  errors were found and corrected;
  errors were found and not corrected;
  errors are present in an address of a frame;
  the means for finding and correcting errors could not be used due to inconsistency of the data.

Yet another embodiment of the method of examining the recording medium in accordance with the invention is realized by selecting areas of the medium and performing the examination of selected areas.

Figure 5:
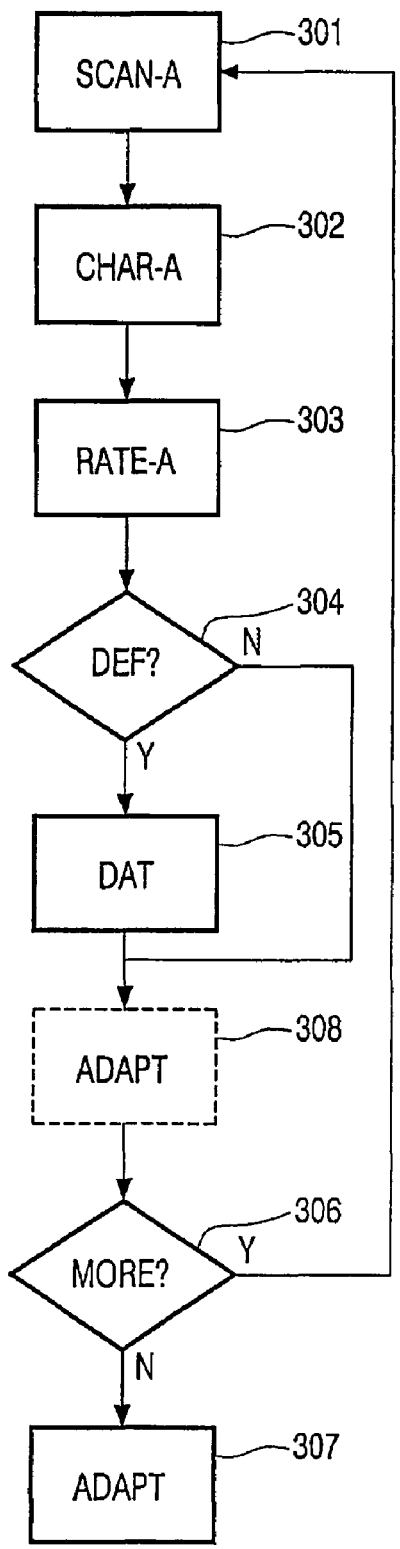
FIG. 5 shows an embodiment of the method, wherein a predefined number of frames in a selected area of the medium are scanned.

FIG. 5 shows an embodiment of the method of examining the recording medium wherein in step 301 a predefined number of frames in a selected area of the medium are scanned. The frames are characterized in step 302 and rated in step 303. In step 304, a check is made whether any of the frames is rated as containing defective data. If so, the selected area comprising those frames is indicated in a defective areas table in the next step 305. In step 306 it is checked whether there are more areas to be examined. If there are more such areas, the next area is taken to be analyzed in step 301. The data recording strategy is adapted in step 307. It should be noted that this step can also be performed before the examination of all selected areas has been completed as indicated by 308.

The data recording strategy may comprise:
  a write step comprising the recording data in a recording unit; and
  a verification step following the write step, comprising the reading data recorded in the write step and comparing the data recorded with the data.

Advantageously, in another embodiment of the method of examining the recording medium, the data recording strategy is adapted so the write commands are executed without verification when the area in which the data is going to be written was scanned and did not contain defects.

Figure 6:
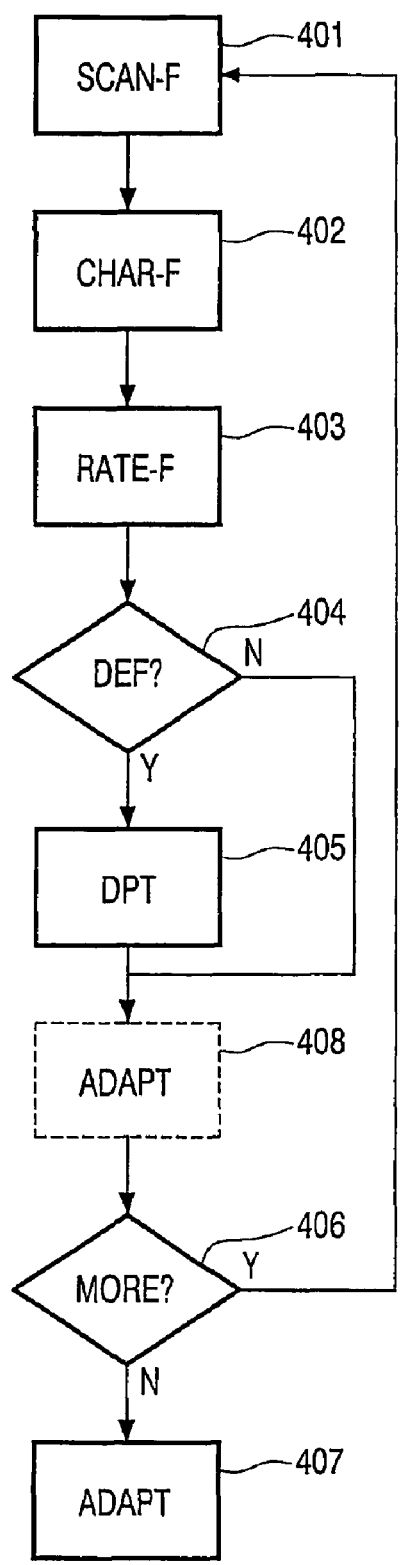
FIG. 6 shows an embodiment of the method, wherein all frames in an area indicated in the defective areas table are scanned.

FIG. 6 shows an embodiment of the method of examining the recording medium. In this embodiment all the frames in an area indicated in the defective areas table are examined. In step 401 a frame in the area indicated in the defective areas table is scanned. The frame is characterized in step 402 and rated in step 403. In step 404, a check is made whether the frame is rated as containing defective data. If so, in the next step 405 a packet comprising the frame is indicated in the defective packets table. In step 406 it is checked whether there are more frames to be examined. If there are more frames, the next frame is taken to be analyzed in step 401. The data recording strategy is adapted in step 407. It should be noted that this step can also be performed before the examination of all frames is completed as indicated by 408.

In yet another embodiment of the method of examining the recording medium, the data recording strategy is adapted so the write commands are executed without verification when the packet in which the data is going to be written is not indicated in the defective packets table and the examination is completed.

A next embodiment of the method of examining the recording medium is characterized in that the area selected for examination is a circular area between two concentric, circular recording tracks on the medium.

Advantageously, in an embodiment of the method of examining the recording medium according to the invention, the circular area chosen for examination is examined by scanning a test recording track in the middle of the circular area.

In another embodiment, all frames comprised in the test recording track in the middle of the selected circular area are scanned in step 301.

In view of a size of expected defects which cannot be corrected by standard error correction methods, it is advantageous that in a next embodiment of the method of examining the recording medium, the separation between two consecutive test recording tracks is 200 μm.

A further embodiment of the method of examining the recording medium is characterized in that the scanning of the recorded data in step 101, 201, 301 or 401 comprises a sub-step of positioning reading means by seeking an address of a frame from a predefined table of addresses.

Advantageously, another embodiment of the method of examining the recording medium is characterized in that the scanning of the recorded data in step 101, 201, 301 or 401 comprises a sub-step of positioning reading means by jumping over a number of the recording tracks, where the number is contained in a predefined table of positions.

Preferably, in a following embodiment of the method of examining the recording medium, the scanning of the recorded data in step 101, 201, 301 or 401 comprises the following sub-steps:
  determining recording parameters of the medium;
  calculating a number of the recording tracks using the recording parameters;
  positioning of reading means by jumping over the calculated number of the recording tracks.

Advantageously, in another embodiment the method of examining the recording medium is adapted, so the compact commands e.g. from a host computer to a recording apparatus used to perform the examination, are handled transparently during the examination of the medium, whereas all access commands will suspend the examination to allow medium access as soon as possible. Suspended examination should be resumed after access command execution.

Yet another embodiment of the method of examining the recording medium can be realized by the requirement that the recording apparatus stays idle some time before the examination becomes active again. Idle time is set preferably to 4 seconds, so either the first start of the examination after the medium insertion or resumption from suspension can only take place when the idle time has already passed.

Whereas the invention has been described with reference to preferred embodiments thereof, it is to be understood that these are not limiting examples. Thus, various modifications may become apparent to those skilled in the art, without departing from the scope of the invention, as defined by the claims. Furthermore, the invention lies in each and every novel feature or combination of features described above. It is noted, that the invention may be implemented by means of a general purpose processor executing a computer program or by dedicated hardware or by a combination of the two, and that in this document the word "comprising" does not exclude the presence of other elements or steps than those listed and the word "a" or "an" preceding an element does not exclude the presence of a plurality of such elements, that any reference signs do not limit the scope of the claims, that "means" may be represented by a single item or a plurality and that several "means" may be represented by the same item of hardware.

The invention claimed is:

1. A recording apparatus for recording data on a rewritable optical recording medium provided with substantially circular recording tracks comprising recorded data arranged in recording units comprising addressable reading units, the recording apparatus comprising:
   input means for receiving the data;
   recording means for recording the data;
   reading means for reading the recorded data;
   error correction means for finding and correcting errors in the recorded data read; and
   control means for controlling the recording and reading of the data;
   wherein
   the control means are designed to examine the medium for the presence of a defect and to adapt a data recording strategy by:
   scanning the medium by reading at least a portion of the recorded data;
   establishing characteristics of the recorded data read;
   rating the recorded data read as defective data based on the characteristics; and
   adapting the data recording strategy according to results of the rating; and
   wherein the control means are further designed to select a circular area between two of the substantially circular recording tracks, and to examine the circular area by examining a test recording track in the middle of the circular area.

2. The recording apparatus as claimed in claim 1, wherein the control means are designed to perform a scanning of a predefined number of the reading units in each recording unit on the medium, and
   to indicate a recording unit in a defective recording units table, if any of the reading units comprised in the recording unit is rated as being defective.

3. The recording apparatus as claimed in claim 2, wherein the predefined number of the reading units is equal to one.

4. The recording apparatus as claimed in claim 1, wherein the control means are designed to rate the recorded data read as defective data if at least one of the following conditions is fulfilled:
   errors were found and corrected;
   errors were found and not corrected;
   errors are present in the address of a reading unit;
   the error correction means could not be used due to inconsistency of the recorded data read.

5. The recording apparatus as claimed in claim 1, wherein the control means are designed to select areas of the medium and to examine selected areas.

6. The recording apparatus as claimed in claim 5, wherein the control means are designed to perform a scanning of a predefined number of the reading units comprised in a selected area and to indicate the selected area in a defective areas table, if any of the reading units is rated as being defective.

7. The recording apparatus as claimed in claim 6, wherein the data recording strategy comprises:
   a write act comprising the recording of the data in a recording unit; and
   a verification act following the write act, comprising the reading of data recorded in the recording unit in the write act and comparing the data recorded with the data; and
   the control means are designed to adapt the data recording strategy to achieve that the verification act is performed only if at least one of the following conditions is fulfilled:
   examining has not yet been completed;
   the recording unit is comprised in the area indicated in the defective areas table.

8. The recording apparatus as claimed in claim 2, wherein the control means are designed to perform a scanning of all reading units in each recording unit comprised in the area indicated in the defective areas table, and
   to indicate a recording unit in a defective recording units table, if any of the reading units comprised in the recording unit is rated as being defective.

9. The recording apparatus as claimed in claim 8, wherein the data recording strategy comprises:
   a write act comprising the recording of the data in a recording unit; and
   a verification act following the write act, comprising the reading of data recorded in the recording unit in the write act and comparing the data recorded with the data;
   the control means are designed to adapt the data recording strategy to achieve that the verification act is performed only if at least one of the following conditions is fulfilled:
   examining has not yet been completed;
   the recording unit is indicated in the defective recording units table.

10. The recording apparatus as claimed in claim 1, wherein the control means are designed to examine test recording tracks substantially 200 μm apart.

11. The recording apparatus as claimed in claim 1, wherein the control means are designed to perform scanning of substantially all reading units along the test recording track.

12. The recording apparatus as claimed in claim 1, wherein the control means are designed to position the reading means by seeking the address of a reading unit from a predefined table.

13. The recording apparatus as claimed in claim 1, wherein the control means are designed to position the reading means by jumping over a number of the recording tracks, the number being read from a predefined table.

14. The recording apparatus as claimed in claim 1, wherein the control means are designed to determine recording parameters of the medium, to calculate a number of the recording tracks using the recording parameters and to position the reading means by jumping over the number of the recording tracks.

15. The recording apparatus as claimed in claim 1, wherein the control means are designed to examine the medium during an idle time of the recording apparatus.

16. A method of examining a rewritable optical recording medium for the presence of a defect in order to adapt a data recording strategy, the medium provided with substantially circular recording tracks comprising recorded data arranged in recording units comprising addressable reading units, the method comprising the acts of:

scanning the medium by reading at least a portion of the recorded data;

establishing characteristics of the recorded data read;

rating the recorded data read as defective data based on the characteristics;

adapting the data recording strategy according to results of the rating;

selecting a circular area between two of the substantially circular recording tracks; and examining the circular area by examining a test recording track in the middle of the circular area.

17. The method as claimed in claim 16, further comprising the acts of:

scanning a predefined number of the reading units in each recording unit on the medium; and indicating a recording unit in a defective recording units table, if any of the reading units comprised in the recording unit is rated as being defective.

18. The method as claimed in claim 17, wherein the predefined number of the reading units is equal to one.

19. The method as claimed in claims 16, further comprising the acts of, finding and correcting errors in the recorded data read; and rating the recorded data read as defective data if at least one of the following conditions is fulfilled:

errors were found and corrected;

errors were found and not corrected;

errors are present in the address of a reading unit; and finding and correcting errors was not possible due to inconsistency of the recorded data read.

20. The method as claimed in claim 16, wherein selected areas of the medium are examined.

21. The method as claimed in claim 20, further comprising the acts of:

scanning a predefined number of the reading units in a selected area; and indicating the selected area in a defective areas table, if any of the reading units is rated as being defective.

22. The method as claimed in claim 21, wherein the data recording strategy comprises:

a write act comprising the recording of the data in a recording unit; and a verification act following the write act, comprising the reading of data recorded in the recording unit in the write act and comparing the data recorded with the data;

and the verification act is performed only if at least one of the following conditions is fulfilled:

examining has not yet been completed;

the recording unit is comprised in the area indicated in the defective areas table.

23. The method as claimed in claim 17, further comprising the acts of:

scanning all reading units in each recording unit comprised in the area indicated in the defective areas table;

indicating a recording unit in a defective recording units table, if any of the reading units comprised in the recording unit is rated as being defective.

24. The method as claimed in claim 23, wherein the data recording strategy comprises:

a write act comprising the recording of the data in a recording unit; and a verification act following the write act, comprising the reading of data recorded in the recording unit in the write act and comparing the data recorded with the data;

and the verification act is performed only if at least one of the following conditions is fulfilled:

examining has not yet been completed;

the recording unit is indicated in the defective recording units table.

25. The method as claimed in claim 16, wherein test recording tracks substantially 200 µm apart are examined.

26. The method as claimed in claim 16, wherein substantially all reading units along the test recording track are scanned.

27. The method as claimed in claim 16, wherein reading means for reading the recorded data are positioned by seeking an address of a reading unit from a predefined table.

28. The method as claimed in claim 16, wherein reading means for reading the recorded data are positioned by jumping over a number of the recording tracks, the number being read from a predefined table.

29. The method as claimed in claim 16, further comprising the acts of:

determining recording parameters of the medium;

calculating a number of the recording tracks using the recording parameters; and positioning reading means for reading the recorded data by jumping over the number of the recording tracks.

30. The method as claimed in claim 16, wherein the examination takes place during an idle time of a recording apparatus used for examining the medium.

31. A recording device for recording data on tracks of a recording medium provided with substantially circular recording tracks comprising recorded data, the recording device comprising:

a head configured to record and read the data;

an error corrector configured to find and correct errors in the recorded data read by the head; and a controller configured to control the head and to examine the recording medium for presence of a defect and to adapt a data recording strategy by reading at least one portion of the recorded data, rating the recorded data read as defective data based on characteristics of the at least one portion of the recorded data, and adapting the data recording strategy according to results of the rating;

wherein the controller is further configured to select an area between two of the tracks and to examine the area by examining a test recording track in the middle of the area.

32. The recording device of claim 31, wherein the controller is further configured to perform a scanning of reading units on the medium, and to indicate at least one of a defective recording unit in a defective recording units table and an location of the recording medium associated with the defective recording unit in a in a defective location table.

33. The recording device of claim 31, wherein the controller is further configured to rate recorded data recorded on the recording medium as the detective data if at least one of the following conditions is fulfilled:

errors were found and corrected;

errors were found and not corrected;

errors are present in an address of a reading unit; and error correction means could not be used due to inconsistency of the recorded data.

* * * * *